United States Patent [19]

Komatsu

[11] 4,395,668

[45] Jul. 26, 1983

[54] MOTORS

[76] Inventor: Fumito Komatsu, 69-1632-12-banchi, Nomura Aza, Ooaza Hirooka, Shiozirishi, Naganoken, Japan

[21] Appl. No.: 308,956

[22] Filed: Oct. 6, 1981

[30] Foreign Application Priority Data

Oct. 11, 1980 [JP] Japan .................................. 55-142294
Jan. 14, 1981 [JP] Japan .................................... 56-4078

[51] Int. Cl.³ .............................................. H02P 1/48
[52] U.S. Cl. ..................................... 318/439; 318/710; 310/68 E; 310/162
[58] Field of Search ............... 318/700, 704, 705, 709, 318/793, 710, 723, 439, 138; 310/162, 68 R, 68 E, 46

[56] References Cited
U.S. PATENT DOCUMENTS 3,014,142 12/1961 Lee ..................................... 310/68 E Primary Examiner—J. V. Truhe
Assistant Examiner—A. Evans
Attorney, Agent, or Firm—Jordan and Hamburg

[57] ABSTRACT

A synchronous motor comprising a permanent-magnet rotor and a stator which, at startup, uses rectifiers for supplying the stator coil with rectified current and a commutator consisting of sliders and brushes both rotary in union with the rotor in order to supply only the rectified component, effective to energize the rotor's rotation, from the AC power-supply, and which is provided with a mechanical conversion device designed such that, when the rotor's rotation has reached nearly the speed of synchronous rotation, the slider is allowed to move in the direction along the rotary shaft to become released from contact with the brush, for removal of contact load and at the same time to supply the stator directly with the power-supply AC.

5 Claims, 17 Drawing Figures

MOTORS

BACKGROUND AND SUMMARY OF THE INVENTION

The present invention relates to synchronous motors, in more detail to synchronous motors which consist essentially of a permanent-magnet-containing rotor and a stator; which, at startup, uses rectifiers and a commutator comprising sliders and brushes both rotary in unison with the rotor to supply the stator with only the rectified component, effective to energize the rotor's rotation, of the AC power-supply; and which are provided with a mechanical conversion device which, when the rotation of the rotor has reached nearly the synchronous rotation, releases the contact load by pushing the slider in the direction of rotary shaft until it moves out of the contact with the brush and at the same time supplies the stator directly with the AC power-supply.

A device of this kind is described by Gianni A. Dotto et al., "SYNCHRONOUS MOTOR STARTER CIRCUIT EMPLOYING COMMUTATOR AND RECTIFIER DURING STARTING," U.S. Pat. No. 3,394,296, which consists essentially of a permanent-magnet-type inner-side rotor and an outer-side stator; which, at startup, use rectifiers and a commutator comprising sliders and brushes both rotary in unison with the rotor to supply the stator with only the rectified component, effective to energize the rotor's rotation, of the AC power-supply; and which, when the rotation of the rotor has reached the synchronous rotation, allows a centrifugal switch provided in the circuit to short the circuit so as to supply the stator directly with the AC power-supply.

However, with such a device that keeps the slider in contact with the brush even after synchronous operation, the contact load consumes a considerable amount of energy and the contact attrition results in considerable decrease in durability.

The first purpose of the present invention is to provide synchronous motors that are capable of automatic release of load resistance during synchronous rotation; the second purpose is to provide synchronous motors that contain a brush and a commutator with greatly augmented durability; the third purpose is to provide synchronous motors that may be produced with reduction in size, weight, and cost through placing the permanent-magnet rotor outside; and the fourth purpose is to provide synchronous motors which have a permanent-magnet rotor in correspondence with a stator, which comprise rectifiers for converting the power-supply AC into rectified current and a commutator for switching the direction of current as the rotor rotates, which possess a conversion circuit capable of supplying the stator coil, during startup, with current constantly in the direction toward energizing the rotation, and which are provided with a constant-speed thrust device designed in such a way that the part of commutator rotary in unison with the rotor is capable of pushing in the direction along the rotary shaft until it is released from the stationary brush section, and that, when the rotation of the rotor has reached the speed for driving as a synchronous motor, the part rotary in union with the rotor is allowed to become disengaged and at the same time the circuit becomes shorted so as to supply the stator directly with the AC power-supply.

DETAILED DESCRIPTION OF THE INVENTION

The synchronous motors based on the present invention will be given detailed description by using the drawings for the two selected application examples: (1) a motor in which the starting mechanism is composed of stationary rectifiers for starting mechanism located in a circuit and of a commutator consisting of a circular cam rotary in union with the rotary shaft and contact switches; (2) a motor in which the starting mechanism is composed of a commutator consisting of brushes and sliders rotary in union with the rotary shaft and of rectifiers located within sliders and rotary in union with the rotary shaft.

Figure 1:
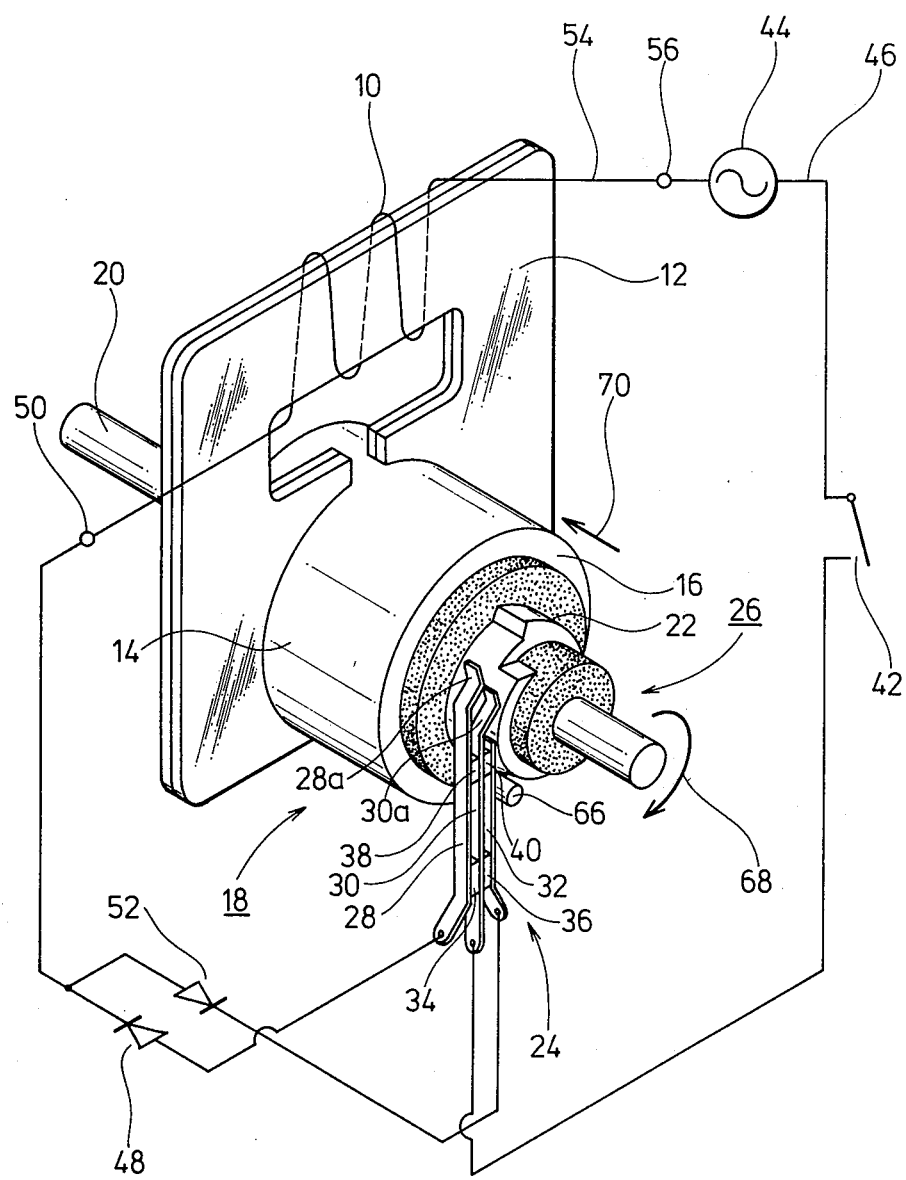
FIG. 1 shows the schematic diagram of an embodiment of the present invention for a synchronous motor.

FIG. 1 is a schematic diagram illustrating the operation principle for the example 2-pole single-phase synchronous motor to which the present invention has been applied. As seen from FIG. 1, the motor possesses the 2-pole stator 12 with coil 10, the 2-pole permanent magnet 14 generating the field, rotor 18 with the centrifugal switch 16 incorporated inside, rotary shaft 20 supporting rotor 18 rotary on a bearing (not shown) between the poles of stator 12, and commutator 26.

Commutator 26 consists of cam 22 and the externally-fixed contact switches 24 which contact with cam 22.

Contact switch 24 is structured by electrically separating the three pieces of contact plate springs 28, 30, and 32 with insulators 34 and 36, forming contacts 38 and 40 between spring 30 and springs 28 and 32, respectively. Spring 30 is connected to terminal 46 on the single-phase AC power supply 44 via the power-supply switch 42, spring 28 is connected to terminal 50 on coil 10 via diode 48 with the polarity as shown, and spring 32 is connected also to terminal 50 via diode 52 opposite to diode 48 in polarity. The other terminal 54 of coil 10 is connected to the other terminal 56 of AC power supply 44.

As seen from FIGS. 2A–3B, cam 22 has the first elevated part 60 covering a circumferential angle of ca. 180° and the second elevated part 62 covering approximately the other 180° angle, the level of the latter being designed to be higher than that of the former. The elevated parts are in rotary movement on concentric orbitals, the first elevated part 60 occupying both the orbitals but the second elevated part 62 being confined on one of the orbitals and designed to overlap the first elevated part 60; the first 60 is half the second 62 in height. Both the elevated parts are arranged so as not to overlap each other at portion 64a or 64b on the circumference of the cam.

Figure 2A:
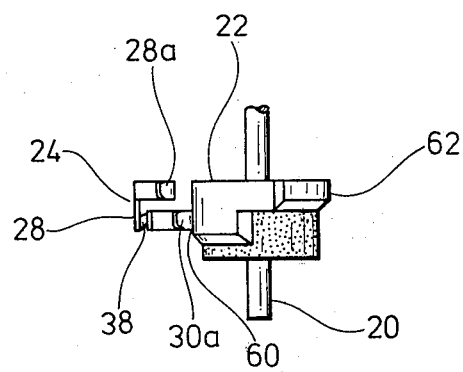
FIGS. 2A, 2B, 2C, 3A, 3B, and 3C illustrate the operation of the switching mechanism used in the motor shown in FIG. 1.
Figure 2B:
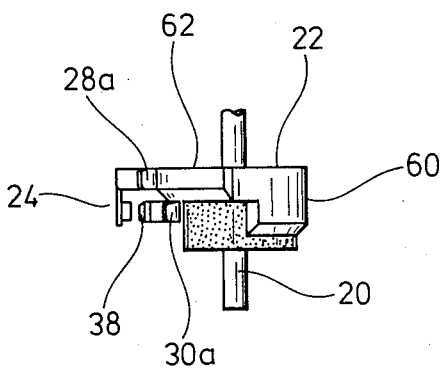
Figure 2C:
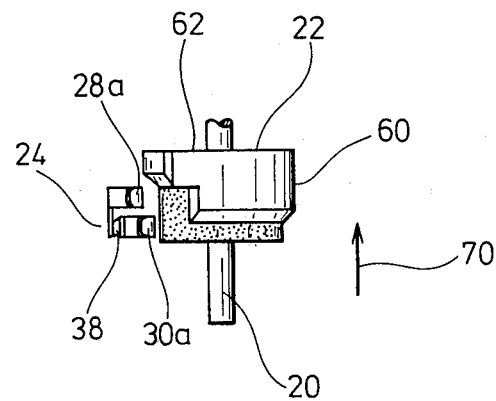
Figure 3A:
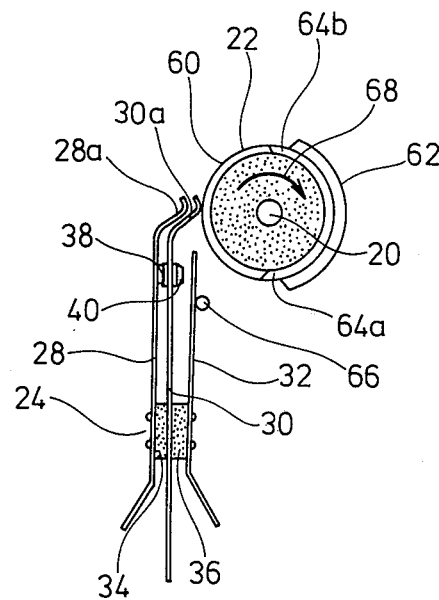
Figure 3B:
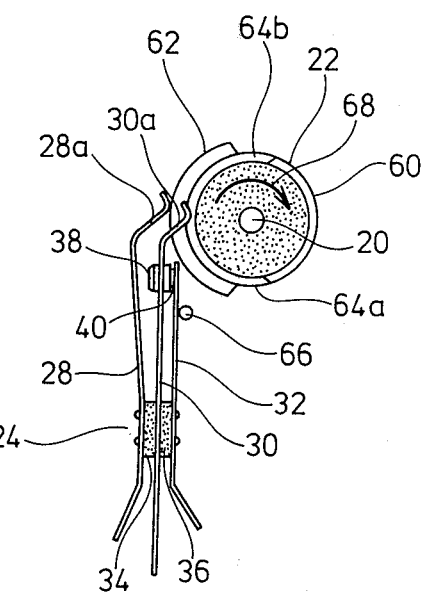
Figure 3C:
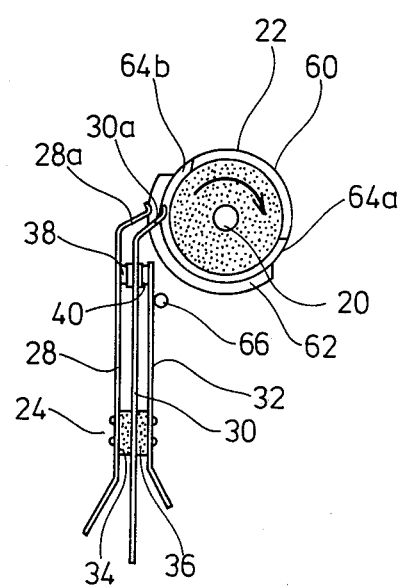

The contact plate spring 28 has its tip 28a assuming an L-shape as shown in FIG. 1 and designed to be in sliding movement with the elevated part 62 of cam 22 and to get pushed up to the left in FIGS. 2A-3B. Spring 30 also has its tip 30a formed as shown in FIG. 1 and designed to be in sliding movement with the elevated part 60 of cam 22 and to get pushed up to the left in FIG. 3A at contact 38 by spring 28. Each of springs 28, 30, and 32 is kept biased to the right in FIG. 3A and spring 32 is restricted by stopper 66. Spring 28 has its base overlapped with spring 30 but is bent laterally at the position of tip 28 so as to be located on the orbital of the elevated part 62. Therefore, when cam 22 is positioned as shown in FIGS. 2A and 3A, contact 38 makes and contact 40 breaks; when cam 22 is positioned as shown in FIGS. 2B and 3B, contact 38 breaks and contact 40 makes.

The switching operation will be described below. Suppose that switch 42 gets closed when rotor 18 is positioned as shown in FIGS. 1, 2A, and 3A. In what follows, this rotary position of rotor 18 will be referred to as the initial position. In this state with closed contact 38, there will be a flow of electricity from terminal 46 on the power supply 44 via switch 42, contact 38, and diode 48 to coil 10. Let this electric current correspond to the positive half-cycle of power supply 44. When the wave form of AC power supply 44 gets inverted in the next half-cycle, the current gets hindered by diode 48 before flowing through coil 10. Thus, while cam 22 is rotating ca. 90° from the position of FIG. 3A, only the positive half-wave AC is supplied to coil 10, making rotor 18 begin to rotate in the direction of arrow 70. When rotor 18 has rotated more than 90° from the initial position, contact 38 gets opened and contact 40 gets closed as shown in FIG. 3B, with resulting connection between terminal 46 on power supply 44 and diode 52. Thus, coil 10 is supplied with the negative half-cycle of AC power supply 44, causing rotor 18 to further rotate, with resulting acceleration of the rotation of rotor 18. When rotor 18, after caused to start and get accelerated as described above, has reached a condition where the rotary positon of rotor 18 is synchronous with the wave-form periodicity of the AC power supply, rotor 18 begins and continues to rotate at the frequency of power supply 44.

Gaps 64a and 64b between the elevated parts 60 and 62 of cam 22 are designed in such a way that, when the tip 30a of spring 30 comes on each gap, both the contacts 38 and 40 are brought into 3-point contact with connection of both the diodes 48 and 52 to AC power supply 44. This is to allow coil 10 to get sufficiently excited even when rotor 18 needs to start at this position. The relative position of rotor 18 and switching mechanism 26 is determined in such a way that, when pole N of rotor 18 faces pole 60 of stator 12, the contact of switch 24 is positioned between the state of FIG. 3A and that of FIG. 3B, i.e., spring 28a and 30a are positioned on gap 64a.

When the motor enters the stationary working state synchronous with the frequency of AC power supply 44, i.e., the synchronous working state, centrifugal switch 16 is put into operation at a prescribed rotary speed close to the rotary speed for the power supply frequency to shift cam 22 in the direction of arrow 70. Centrifugal switch 300 will later be described in detail with respect to its structure and operation. When cam 22 is shifted in the direction of arrow 70, i.e., toward rotor 18 in the axial direction of rotary shaft 20, the sliding between cam 22 and contact switch 24 gets disengaged and, as seen from FIGS. 2C and 3C, springs 28, 30, and 32 get energized to the right of the figures up to the limit of stopper 66 so that both the contacts 38 and 40 are brought into simultaneous contact. In this 2-point contact state, both the diodes 48 and 52 are connected to terminal 46 of AC power supply 44, causing no switching operation to be effected. However, since rotor 18 is in synchronous rotation with the frequency of power supply 44, the rotary magnetic field produced by stator 12 keeps rotor 18 in the synchronous working state, i.e., this motor operates completely as an ordinary synchronous motor.

The time at which centrifugal switch 16 is put into operation may be within an interval centering at the stationary rotary speed for the power supply frequency, provided the stationary working state may be reached ultimately.

Figure 4:
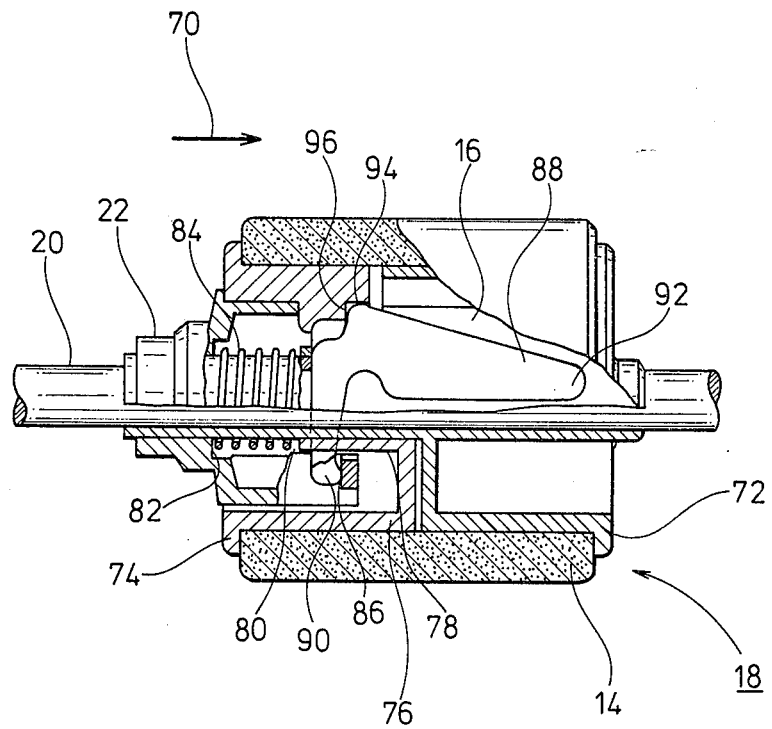
FIG. 4 is a partially-exploded side view of the centrifugal switch shown in FIG. 1.

The structure and operation of centrifugal switch 16 will be described in detail by using FIG. 4, which is a partially-exploded side view of centrifugal switch 16. On the outer circumference of casing 72 fixed to rotary shaft 20 there is a permanent magnet 14 is fixed with insertion, forming rotor 18. Cam 22, rotary in unison with rotary shaft 20, is accommodated in part 74, which is located in and rotary in union with casing 72, so as to be movable in the axial direction of rotary shaft 20. Part 74 has an outer cylinder 76 and inner cylinder 78, coil spring 84 extending in the axial direction in the figure is inserted between the left end 80 of inner cylinder 78 and shoulder 82 in the inner cavity of cam 22, and cam 22 is energized leftward in the figure toward rotor 18. The bottom 86 of the inner cavity of cam 22 has the working end 90 of a pair of weights 88 contacting as shown in the figure. Weight 88 possesses weight section 92 and supporting end 94 which is in contact with projection 96 of part 76. Thus, when the rotary speed of rotor 18 exceeds the prescribed rotary speed, the centrifugal force exerting on weight section 92 moves weight section 92 in the centrifugal direction with respect to rotary shaft 20. This movement results in a force which in turn moves the working end 90 to the right in the figure from supporting end 94, pulling cam 22 in the direction of arrow 70 against spring 84. On the contrary, when the rotary speed of rotor 18 goes below the prescribed value, spring 84 forces cam 22 to move in the direction opposite to arrow 70. The prescribed rotary speed is determined depending on the relative relation between the weight of weight section 92, strength of spring 84, etc.

A description has been made of a 2-pole single-phase synchronous motor as an embodiment of the present invention. This technology is applicable to 2n-pole synchronous motors where n is an integer equal to or more than 2. In this case, the mechanism is made to be composed of two cam sections, the first and second cam sections; the first cam section covering a rotary angle of ca. 360°/2n makes the first contact closed and the second opened, thereby connecting said AC power supply to one of said first and second rectifying mechanisms, and the second cam section covering 360°/2n supplementally makes the first contact opened and the second closed, thereby connecting said AC power supply to the other one of said first and second rectifying mechanisms. Also, in applications to three-phase AC synchronous motors, we have only to use three stators having their coils disposed with 120° phase difference to one another together with three corresponding contacting mechanisms.

Figure 5:
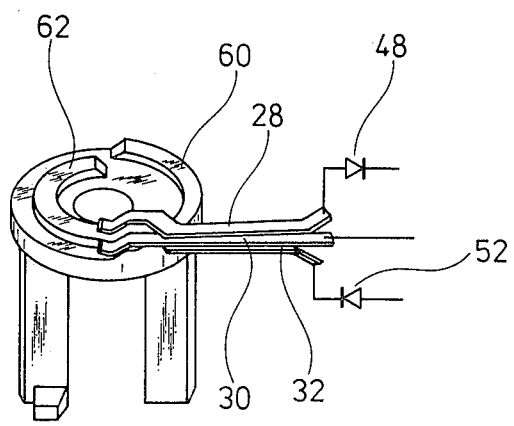
FIG. 5 shows another cam mechanism.
Figure 6:
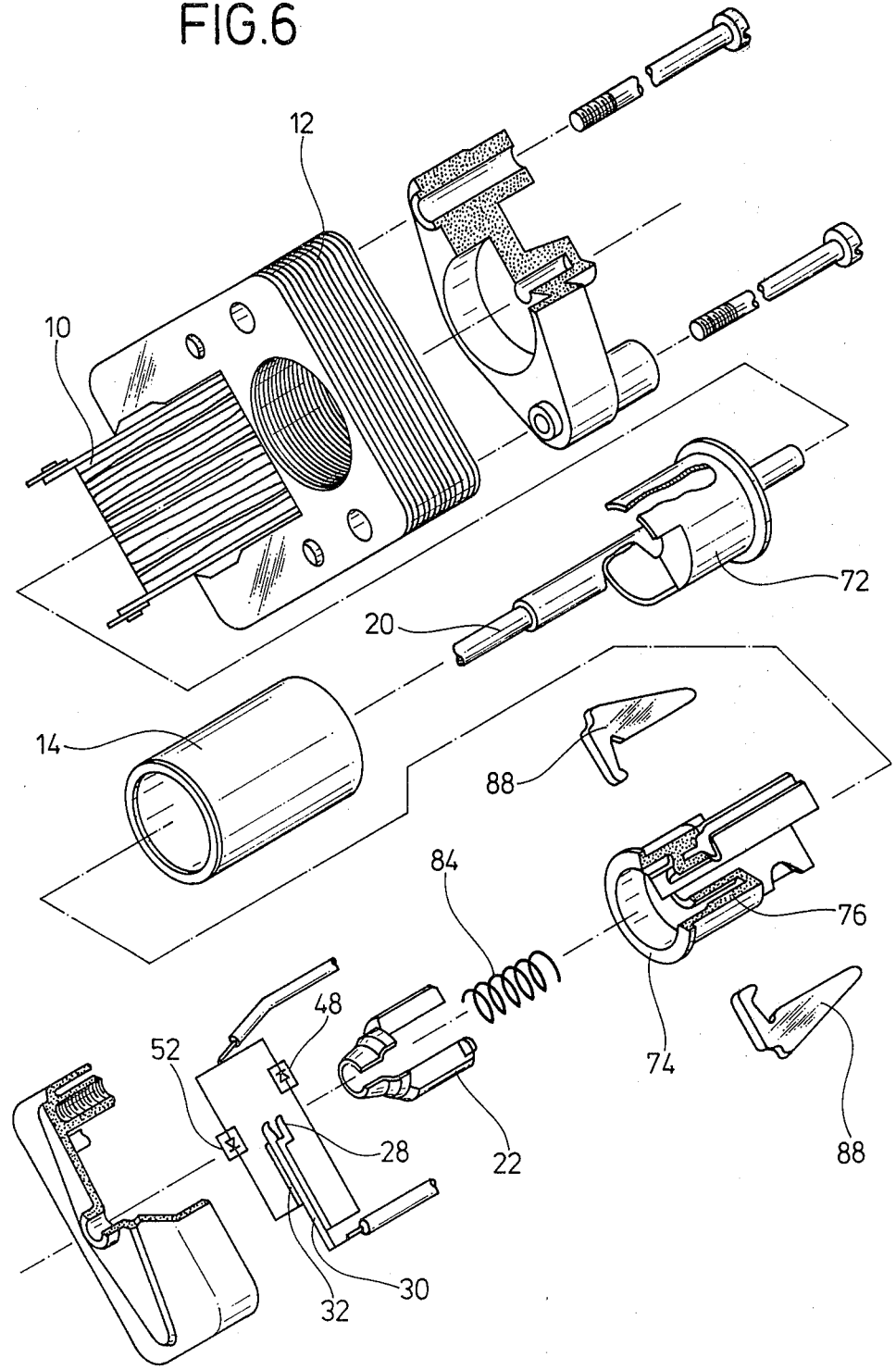
FIG. 6 shows the arrangement of components for the centrifugal switch.

The cam mechanism may be formed by such projections as are disposed projected in the axial direction on the circumference as shown in FIG. 5 or may be such as is capable of rotation effecting the required operation of the contacting mechanism.

Next, a description will be given of the other embodiment.

Figure 7:
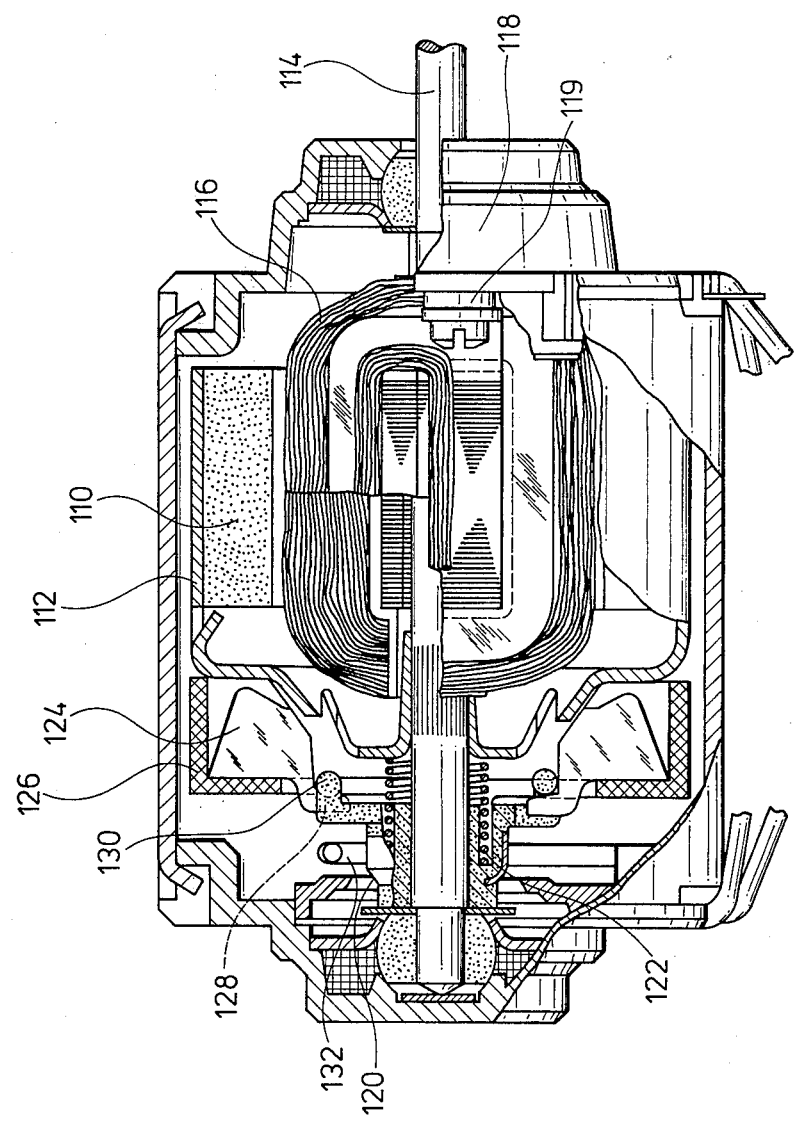
FIG. 7 is the exploded cross-sectional view of an outer-rotor-type single-phase 2-pole synchronous motor with rectifiers built in sliders.

FIG. 7 is the exploded cross-sectional view of an example application of the present invention to a 2-pole single-phase synchronous motor. 110 is a ring-like 2-pole permanent-magnet rotor, which is designed to shield the magnetic flux by cap 112 and rotate in union with rotary shaft 114.

116 is a 2-pole stator, which is fixed on bearing 118 of rotary shaft 114 with bolt 119 and inserted in the space between rotary shaft 114 and rotor 110.

120 is a slider, which is divided in the circumferential direction of rotary shaft 114 in a circumferential angle 180°, is capable of free sliding in the axial direction of rotary shaft 14, and is under pressure to the left by spring 22.

124 is a weight, which is accommodated within case 126, has its inner end hooked on connecting section 128 extending from slider 120 toward case 126, and is capable of free rotation about the head corner of weight 124 as rotation center. 132 is a brush, which is in sliding contact with slider 120 at the time of starting.

Figure 8A:
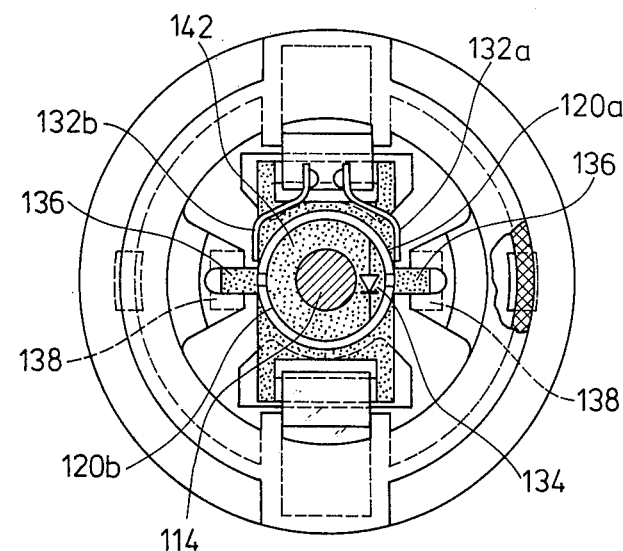
FIG. 8(A) is the axial-direction cross-sectional view of a slider.

FIG. 8(A) is slider 20 viewed from the cross section of shaft. Slider 120 is composed of slider pieces 120a and 120b each of which covers rotary shaft 114 from left and right with each circumferential angle 180°. Within slider 120 there is rectifier 134 which connects slider pieces 120a and 120b in the conductive direction from slider piece 120a to 120b.

Brush 132 consists of brushes 132a and 132b, which are in sliding contact with slider pieces 120a and 120b, respectively.

136 is a slider guide, which fits keyway section 138 so as to allow slide 130 to rotate in unison with rotary shaft 114 and to slide freely in the axial direction.

Figure 8B:
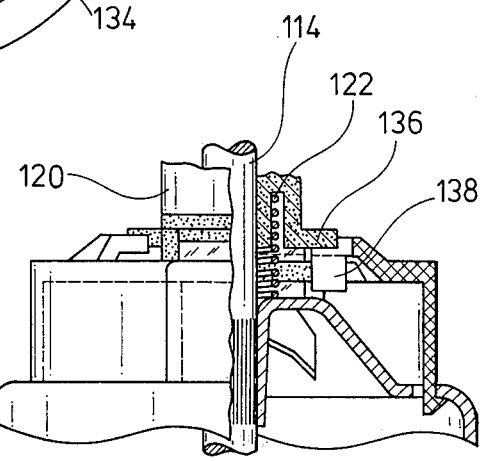
FIG. 8(B) is the partially-exploded cross-sectional view of a slider viewed from top.

FIG. 8(B) is a partially-exploded view of slider 120 viewed from top.

Figure 8C:
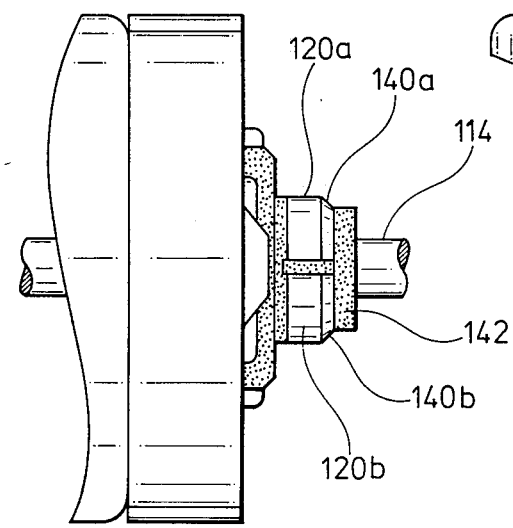
FIG. 8(C) is a slider viewed from side.

FIG. 8(C) is slider 120 viewed from left side. To sliding sections 120a and 120b is connected step section 142 via taper sections 140a and 140b, respectively.

Figure 9:
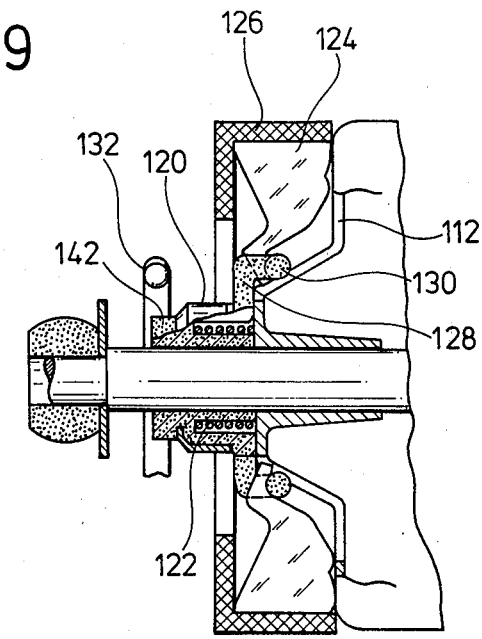
FIG. 9 is a cross-sectional view illustrating the slider which is in the thrusted state after the rotation of the rotor has approached the synchronous rotation.

FIG. 9 illustrates the state where the number of revolutions of rotor 110 has approached the synchronous rotation number with resultant outward opening of weight 124 by centrifugal force.

The weight 124 is designed to begin to open outward at a prescribed number of revolutions. Opening of weight 124 will cause the inner end section of weight 124 to move around the right-end L-shaped section 130 of connecting section 128 and at the same time to move from the state of contacting with the vertical wall inside case 126 to the state of contacting with the horizontal wall. This in turn causes slider 120 via connecting section 128 to be pulled toward stator 116 (to the left) against the pushing pressure of spring 122. When slider 120 is thrusted in the axial direction, brushes 132a and 132b having been in sliding contact with slider pieces 120a and 120b will come, as they are, to correspond to step section 142 of slider 120.

Figure 10:
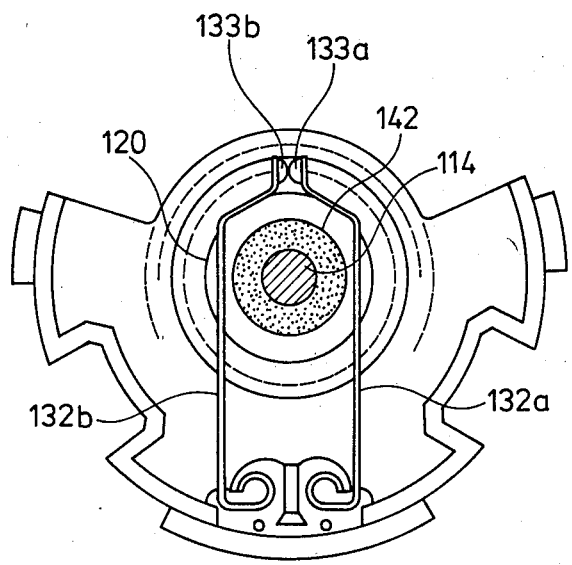
FIG. 10 illustrates the state of brush conduction after the slider has been thrusted.

FIG. 10 shows brush 32 in its conductive state, where slider 20 is pulled in, brushes 132a and 132b are out of slider pieces 120a and 120b, and the upper contact sections 133a and 133b are in contact with each other at step section 142 of smaller diameter.

With this structure, when brush 132a is supplied with electricity from a single-phase AC power supply, rectifier 134 allows electric current to flow from slider piece 120a to 120b, the rectified current through brush 132b is passed through coil 117 of stator 116, and stator 116 is energized so as to accelerate the corresponding permanent-magent rotor 110.

As rotor 110 rotates 180°, slider 120 is also caused to rotate 180°, when the direction of current through coil 117 is reversed because of the arranged current path, i.e., power supply→brush 132a→slider piece 120b→reverse rectifier→slider piece 120a→brush 132b→coil 117; thus, in correspondence with a 180° rotation of the poles of permanent-magnet rotor 110, the poles of stator 116 also get reversed, accelerating the rotation of rotor 110.

In the sequence above the rotary speed of rotor 10 is increased until it gets synchronous with the frequency of the AC power supply, when slider 120 will be thrusted in the axial direction as described above, causing contacts 133a and 133b of brushes 132a and 132b to be short-circuited with each other; thus, there is a direct flowing of AC current through coil 17, under which condition the motor works as a synchronous motor.

Figure 11:
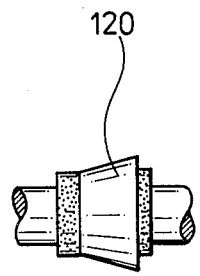
FIG. 11 illustrates another embodiment of the brush.

FIG. 11 illustrates another example of a structure for slider 120 and brush 132. Slider 120 is tapered smaller in the disengaging direction. It is desired that the brush (not shown) has the same slope as the tapered section so as to be capable of tight contact with the larger-diameter part of the tapered section.

A description has been made of embodiments of the present invention in the case of single-phase 2-pole. For the case of single-phase multi-pole, it may easily be understood that we have only to use a permanent-magnet rotor with 2n poles (n: an integer equal to or more than 2), to use one, less than n, or n stators in correspondence with the number of rotor poles, and to have 2n slider pieces disposed with intervals of circumferential angle $2\pi/2n$ around the rotary shaft.

In this case, it is necessary, as with the case of 2-pole, that the rectifiers within the sliders are to be connected so that the slider pieces are conductive in the circumferential direction alternately as in (+), (−), (+), (−), etc., with resulting connection in the order brush 132a→(+) slider piece→(−) slider piece→brush 132b→coil 117.

The embodiments described above relate to single-phase AC power supply. In cases where a three-phase AC power supply is used, as in the case of the above application examples, we have only to dispose three sets of switching mechanism and stator with 120° phase difference and connect these sets to one another in correspondence with the three-phase AC power supply.

Other thrusting mechanisms for the slider are available. In one example, case 126 has a sirocco fan united and case 126 together with slider 20 is made slidable in the axial direction and pushed opposite to the fan by spring 122; case 126 is subject to an adjustment in such a way that rotation of the fan at a speed exceeding a prescribed value produces a negative pressure inside case 126 so as to attract case 126 to the right with slider 120 thrusted. In another example, a screw fan is provided on the outer side of case 126 and adjustment is to be made in such a way that rotation of the screw fan at a speed exceeding a prescribed value causes the fan to advance to the right with slider 120 thrusted (not shown).

With the above structures for the present invention, we may produce motors of smaller size and higher efficiency and since, when the speed of motor has approached a limit allowing synchronous operation, the autostart mechanism is made completely released, resulting in elimination of mechanical, electrical resistance on the switching mechanism, no generation of spark due to the brush sliding, no damage on sliding parts, and no noise generation from sliding parts.

The present invention is effective in making the motor smaller and lighter and to lowering the cost, since the permanent-magnet rotor positioned outside surrounds the stator placed inside with reduced leaking magnetic flux and increased magnetic efficiency and a smaller rotor is required than with a permanent-magnet rotor placed inside.

Descriptions have been made of appropriate example applications of the present invention. It goes without saying that the application of the present invention is not restricted to the example cases but applicable to a variety of modifications within the scope of the spirit of the invention.

I claim:

1. In a synchronous motor having a permanent-magnet motor, a stator, rectifiers for converting the AC power supply into rectified current, and a commutator for switching the direction of current as the rotor rotates during start-up, and means for switching the AC supply directly to the stator when the rotor approaches synchronous speed; the improvement wherein the commutator comprises a rotary component which rotates with the rotor and engages fixed switching elements for effecting switching of the current to rectify current for the motor, said rotary component being axially displaceable to release it from contact with said switching elements, and means are provided for effecting said displacement when the rotor approaches synchronous speed, said displacement allowing said switching elements to contact each other to permit the AC current to be supplied directly to the stator by way of said switching elements.

2. A synchronous motor according to claim 1, wherein the commutator rotary component comprises a cam mechanism rotary in unison with the rotor, and said switching elements comprise first, second and third springs resiliently biased toward the cam mechanism, first and second contacts between the first and second springs and between the second and third springs, respectively, whereby the contacts are made and broken by the action of the cam on the springs, the springs and contacts being arranged to connect the power supply to the stator coils via first and second rectifiers arranged in parallel with opposite polarity, said cam mechanism comprising first and second cam sections, the first of which covers a rotary angle of substantially $360°/2n$ and closes the first contact and opens the second, thereby connecting said AC power supply to one of said first and second rectifiers, and the second covers substantially $360°/2n$ and sequentially opens the first contact and closes the second, thereby connecting said AC power supply to the other one of said first and second rectifiers; and said springs while out of contact with the cam mechanism, are mounted to have both the first and second contacts closed.

3. A synchronous motor according to claim 1, wherein the commutator rotary component has 2n-pole sliders circumferentially disposed at equal intervals with circumferential angle $2\pi/2n$, these sliders are connected by at least one rectifier, rotating with the rotor, so as to be conductive alternately as in the order (+), (−), (+), (−), and two brushes are provided, one of which is in contact with a (+) slider while the other is in contact with a (−) slider, one brush being directly connected to the AC power supply and the other being connected to the AC power supply via the stator coil.

4. A synchronous motor according to claim 1, wherein the commutator rotary member is urged by a spring axially towards the position in which it engages said fixed elements and a centrifugal weight mechanism is arranged so that when a determined rotor speed has been reached, centrifugal movement of the weight moves the commutator rotary member axially against the spring and out of engagement with said fixed elements.

5. A synchronous motor according to claim 1 arranged for 3-phase supply operation, and having three stator members each with its own set of commutator contacting elements and arranged with 120° phase difference in accordance with the phases of the AC power supply.

* * * * *